United States Patent
Istomin et al.

(10) Patent No.: US 12,323,457 B2
(45) Date of Patent: Jun. 3, 2025

(54) USING PROOF OF WORK FOR PREVENTING DISTRIBUTED DENIAL OF SERVICE ATTACKS

(71) Applicant: AT&T Intellectual Property I, L.P., Atlanta, GA (US)

(72) Inventors: Mikhail Istomin, Brooklyn, NY (US); Paul Giura, Cohoes, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 135 days.

(21) Appl. No.: 18/089,929

(22) Filed: Dec. 28, 2022

(65) Prior Publication Data

US 2024/0223598 A1    Jul. 4, 2024

(51) Int. Cl.
*H04L 9/40*            (2022.01)

(52) U.S. Cl.
CPC ...... *H04L 63/1458* (2013.01); *H04L 63/1425* (2013.01)

(58) Field of Classification Search
CPC .......... H04L 63/1458; H04L 63/1425
See application file for complete search history.

(56) References Cited

U.S. PATENT DOCUMENTS

| | | | |
|---|---|---|---|
| 11,308,228 B1* | 4/2022 | Tian | G06Q 20/3674 |
| 2010/0031315 A1* | 2/2010 | Feng | H04L 63/1458 |
| | | | 709/229 |
| 2016/0094611 A1* | 3/2016 | Chow | H04L 67/61 |
| | | | 709/203 |
| 2018/0183688 A1* | 6/2018 | Mihály | H04L 41/5051 |

* cited by examiner

*Primary Examiner* — Sangseok Park
(74) *Attorney, Agent, or Firm* — Hartman & Citrin LLC (57) ABSTRACT

Concepts and technologies disclosed herein are directed to using proof of work for preventing distributed denial of server ("DDoS") attacks. A server system can receive a resource request from a client system. The resource request can specify a resource. The server system can determine a congestion level based upon a load metric and a threshold. In response to determining that the load metric is above the threshold, the server system can determine that the congestion level is indicative of a high demand period. In response to the resource request being received during the high demand period, the server system can provide a work assignment to the client system. The server system can receive work results for the work assignment sent to the client system. In response to receiving the work results, the server system can process the resource request and can send the resource to the client system.

14 Claims, 8 Drawing Sheets

USING PROOF OF WORK FOR PREVENTING DISTRIBUTED DENIAL OF SERVICE ATTACKS

BACKGROUND

The increased capacity of current computer networks, besides creating a better experience for customers by reducing latency and allowing faster data transfers in larger volumes, also creates an opportunity for larger Distributed Denial of Service ("DDoS") attacks that can take advantage of the increasing bandwidth to create even larger volumes of attack traffic to server endpoints. One popular method to protect against DDoS attacks is to employ a scrubbing service that redirects all the attack traffic and benign traffic to a network of "scrubbers" that can absorb most of the attack volume, and that allows only benign service to reach the destination. However, for the scrubbing service to be effective, it needs to be able to keep up with every uptick in the attack volume. If the scrubbers cannot keep up with expanding attack volume, the scrubbers quickly become ineffective. This is pertinent because attacks of this nature are expected to continue to increase in both number and volume over time. Therefore, it is a continuous arms race between DDoS attackers and service providers that is only increasing the cost of protection against DDoS attacks for service providers.

SUMMARY

Concepts and technologies disclosed herein are directed to using proof of work for preventing DDoS attacks. According to one aspect of the concepts and technologies disclosed herein, a server system can receive a resource request from a client system. The resource request can specify a resource. The server system can determine a congestion level based upon a load metric and a threshold. In response to determining that the load metric is above the threshold, the server system can determine that the congestion level is indicative of a high demand period. In response to the resource request being received during the high demand period, the server system can provide a work assignment to the client system. The server system can receive work results for the work assignment sent to the client system. In response to receiving the work results, the server system can process the resource request and can send the resource to the client system.

In some embodiments, while waiting for the work results, the server system can receive an additional resource request from the client system. The server system can deny the additional resource request, such as by ignoring the additional resource request.

In some embodiments, the server system can receive a work request from the client system. In response to the work request, the server system can send a further work assignment to the client system. In some embodiments, the work request can be receiving during a pre-request token generation period. In these embodiments, the server system can receive further work results associated with the further work assignment. The server system can then provide, in compensation for the further work results, a token to be used to request the resource during the high demand period. In other embodiments, the server system can receive the work request from the client system during the high demand period.

In some embodiments, the resource request includes a token to compensate the server system for the resource during the high demand period.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

As an alternative way of dealing with the aforementioned issue, the concepts and technologies disclosed herein shift the burden away from a centralized architecture employed currently by scrubbers towards clients trying to access resources. The concepts and technologies disclosed herein provide a method to discourage and prevent DDoS attacks by enforcing extra computation on the requester side (i.e., client system side) to access a network resource when an end point server or service congestion is detected, either benign or malicious. In a congestion situation, when a load metric is above a set threshold, the method proposes the use of a proof of work mechanism, or a challenge, to be able to access the requested resource. On the other hand, if the metric is at or below the threshold, the requests are served without any challenge.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies using proof of work for preventing DDoS attacks will be described.

Figure 1A:
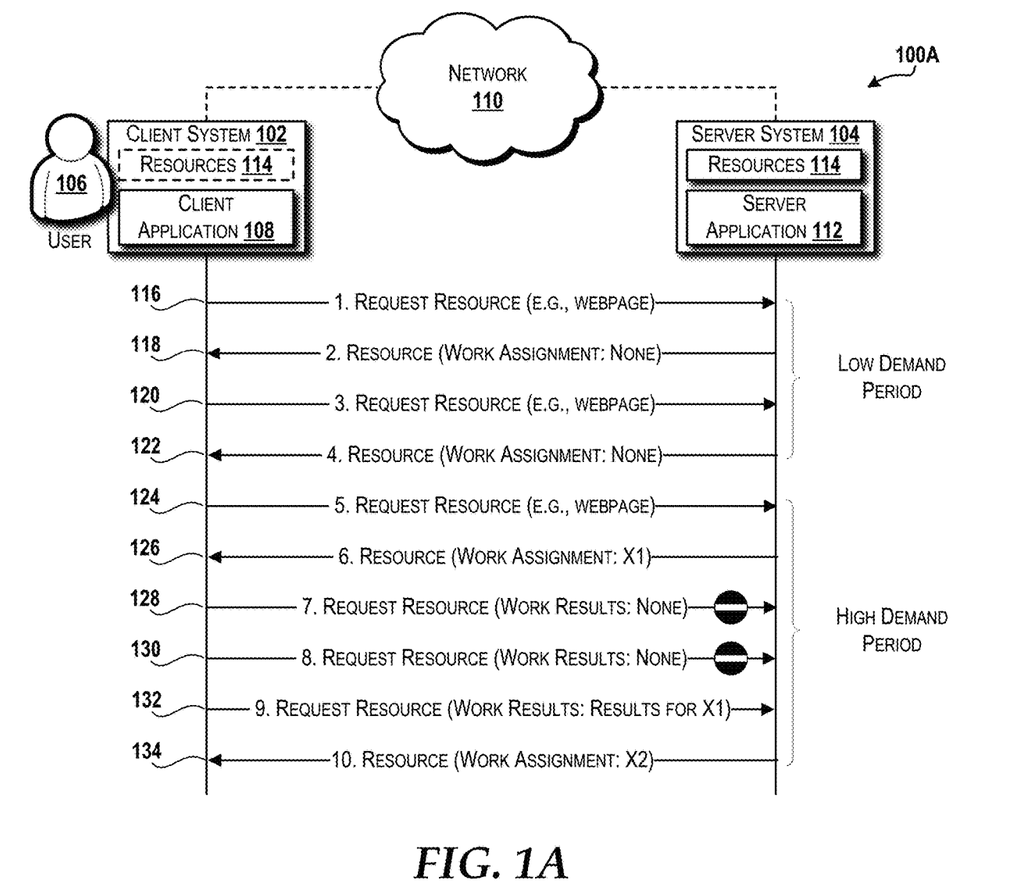
FIG. 1A is a ladder diagram illustrating messages exchanged between a client system and a server system using proof of work for preventing DDoS attacks, according to an illustrative embodiment of the concepts and technologies disclosed herein.

Turning now to FIG. 1A, a ladder diagram illustrating a message exchange 100A between a client system 102 and a server system 104 using proof of work for preventing DDoS attacks will be described, according to an illustrative embodiment of the concepts and technologies disclosed herein. In this implementation, the client system 102 is unaware of the server system 104 when first connecting.

The client system 102 can be associated with one or more users 106 (shown as an individual "user 106") that can utilize a client application 108, executed by one or more processors (best shown in FIGS. 3 and 4) of the client system 102, to communicate over a network 110 (best shown in FIG. 5) with a server application 112 executed by one or more processors (best shown in FIGS. 3 and 4) of the server system 104.

The client system 102 can be a computer system (best shown in FIG. 3), a mobile device (best shown in FIG. 4), a video game system, a set-top box, or any other computing system/device. The server system 104 can be a standalone server system or part of a server cluster. Moreover, the server system 104 can be a physical server or a virtual server, such as a virtual server hosted on a cloud computing platform 600.

The server system 104 can host any number of resources 114 (referred to herein collectively as "resources 114" or individually as "resource 114"). The resources 114 can be any type of digital resource, some examples of which include text, media (e.g., images and/or video), video games and/or other interactive entertainment, webpages, combinations thereof, and/or the like. Although the resources 114 are shown residing on the server system 104, the resources 114 alternatively or additionally may be stored on a remote storage system (not shown). The embodiments described herein will focus on the resources 114 being a webpage. As such, the client application 108 can be a web browser and the server application 112 can be a web server application. Other client applications 108 can include media playback applications (e.g., image viewer or video player), video game applications, other interactive entertainment applications, combinations thereof, and/or the like. Likewise, other server applications 112 can include media server applications, video game server applications (e.g., online multiplayer servers), other interactive entertainment server applications, combinations thereof, and/or the like. These examples are merely illustrative and should not be construed as being limiting in any way.

In the illustrated example, the client system 102, via execution of the client application 108, can generate a request for a resource 114 (e.g., a webpage) and can send the request (generally shown as 116) for the resource 114 to the server system 104. In response, the server system 104, via execution of the server application 112, can respond (generally shown as 118) to the request with the resource 114. The client system 102 can then generate another request (generally shown as 120) for another resource 114, to which the server system 104 can respond (generally shown as 122) with the other resource 114. The requests and responses 116, 118, 120, 122 are exchanged during a low demand period. During the low demand period, interactions between the client system 102 and the server system 104 can be identical to interactions with the server system 104 operating under normal conditions. As shown at 116, 118, 120, 122, the client system 102 can freely request the resource(s) 114 (e.g., webpage(s)) from the server system 104 and can receive responses as if the client system 102 is interacting with any normal server.

Alternatively, when the server system 104 is operating during a high demand period, as the case may be during a DDoS attack, the client system 102 can initially request the resource 114 as normal (generally shown as 124), but the first response (generally shown as 126) provided by the server system 104 can include a work assignment (shown as X1). The work assignment can be anything that would require the client system 102 to invest some computational or time resources. As shown at 128, 130, further requests made by the client system 102 without providing any work results will be ignored by the server system 104. At 132, however, the client system 102 sends another request with work results for the work assignment X1. The server system 104 can process that request and return the requested resource at 134. In the illustrated example, the server system 104 can provide a further work assignment (shown as X2), which must be completed by the client system 102 before any further requests will be processed. This can continue until the server system 104 is no longer under heavy load.

Figure 1B:
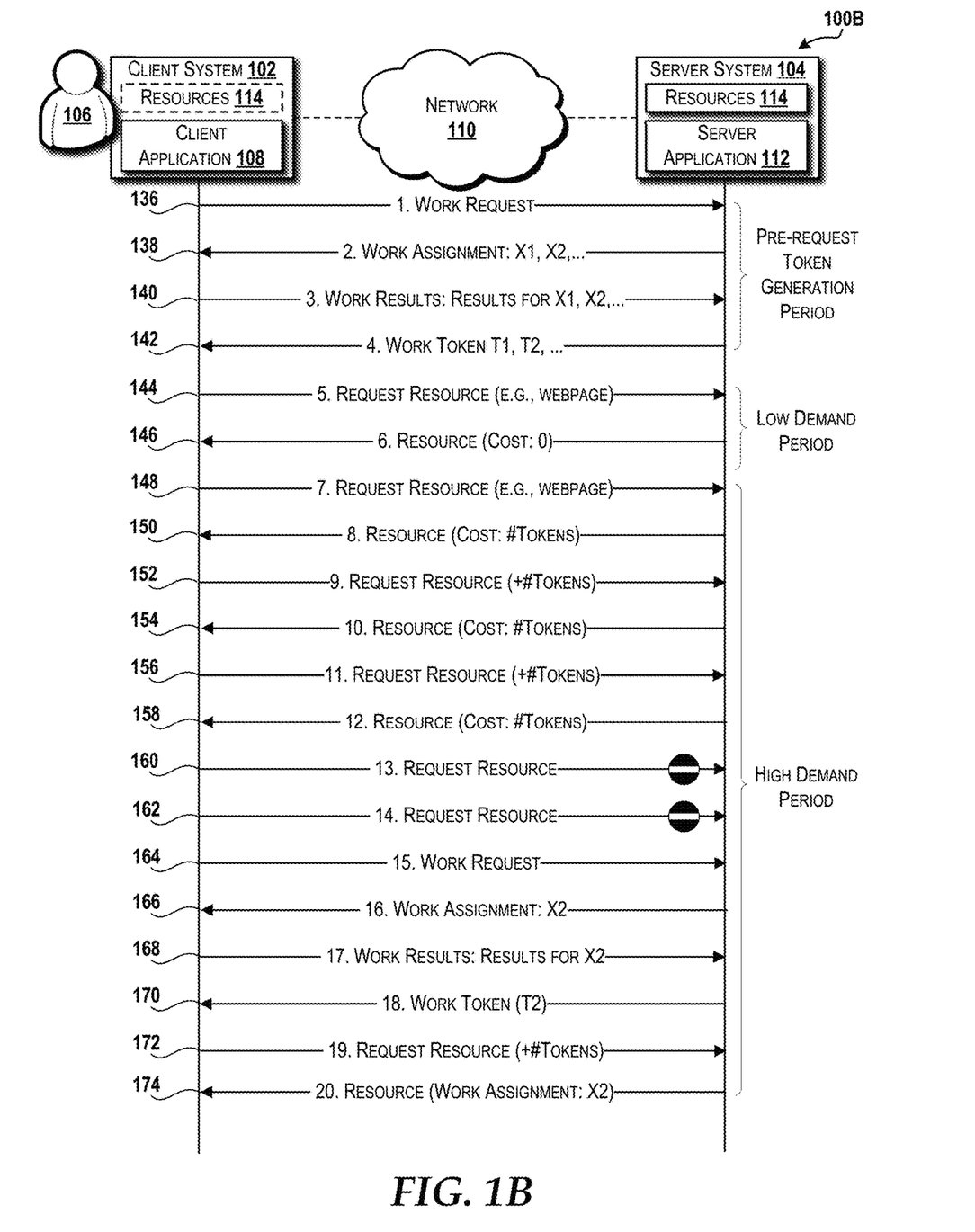
FIG. 1B is another ladder diagram illustrating messages exchanged between a client system and a server system using proof of work for preventing DDoS attacks, according to an illustrative embodiment of the concepts and technologies disclosed herein.

Turning now to FIG. 1B, another ladder diagram illustrating another message exchange 100B between the client system 102 and the server system 104 using proof of work for preventing DDoS attacks will be described, according to an illustrative embodiment of the concepts and technologies disclosed herein. In this implementation, the client system 102 is aware of the server system 104 when first connecting.

In the illustrated example, the client system 102, via execution of the client application 108, can generate a work request for one or more work assignments and can send the work request (generally shown as 136) to the server system 104. In response, the server system 104, via execution of the server application 112, can respond (generally shown as 138) to the work request with the one or more work assignments (X1, X2, . . . ). The client system 102 can then perform the requested work assignment(s) and provide work results to the server system 104 (generally shown as 140). The server system 104 can receive the work results and can compensate the client system 102 via one or more work tokens (T1, T2 . . . ) (generally shown as 142). Each work assignment can be worth one or more tokens. The server system 104 may inform the client system 102 of how many work tokens each work assignment is worth. Alternatively, the server system 104 can be programmed to withhold this information. The requests and responses 136, 138, 140, 142 are exchanged during a pre-request token generation period. During the pre-request token generation period, the client system 102 is not limited to performing work assignments specifically when requesting resources from the server system 104. Instead, the client system 102 can request work assignments and execute the work assignments ahead of time (generally shown as 136, 138, 140, 142).

In the illustrated example, the client system 102, via execution of the client application 108, can generate a request for a resource 114 (e.g., a webpage) and can send the request (generally shown as 144) for the resource 114 to the server system 104. In response, the server system 104, via execution of the server application 112, can respond (generally shown as 146) to the request with the resource 114 (with a cost of zero work tokens). This exchange occurs during a low demand period (described in further detail above).

Alternatively, when the server system 104 is operating during a high demand period, as the case may be during a DDoS attack, the client system 102 can initially request the resource 114 as normal (generally shown as 148), but the first response (generally shown as 150) provided by the server system 104 can include a cost of X tokens. In some embodiments, the server system 104 provides the resource 114 requested along with a notification that the cost is X tokens. If the client system 102 is a legitimate system (i.e., not part of a DDoS attack), the client system 102 can provide X tokens in the next request. In other embodiments, the server system 104 denies the request and includes a notification that the cost is X tokens as part of the denial. The client system 102 can then request the resource 114 again and provide X tokens to cover the cost. The client system 102 and the server system 104 can continue with similar exchanges (shown generally as 152, 154, 156, 158) as long as the client system 102 has enough tokens to cover the cost.

In the illustrated example, the client system 102 requests another resource 114 (generally shown as 160) but fails to provide the necessary tokens. In this scenario, the server system 104 ignores any further request (generally shown as 162) until another work request is received (generally shown as 164). In response, the server system 104, via execution of the server application 112, can respond (generally shown as 166) to the work request with the one or more work assignments (X2 in the illustrated example). The client system 102 can then perform the requested work assignment (s) and provide work results to the server system 104 (generally shown as 168). The server system 104 can receive the work results (generally shown as 170) and can compensate the client system 102 via one or more work tokens (T2 in the illustrated example). At 172, the client system 102 can request another resource 114 and can provide the number of tokens required to cover the associated cost. In response, at 174, the server system 104 can respond with the requested resource 114 and any additional work assignments.

In order to prevent hording of tokens, an expiration date can be set to ensure that tokens are used within certain period of time. Also, an upper limit can be set on how many tokens a single entity (e.g., the client system 102 or the user 106) can have, as well as adjusting the cost of services depending on demand.

Figure 2A:
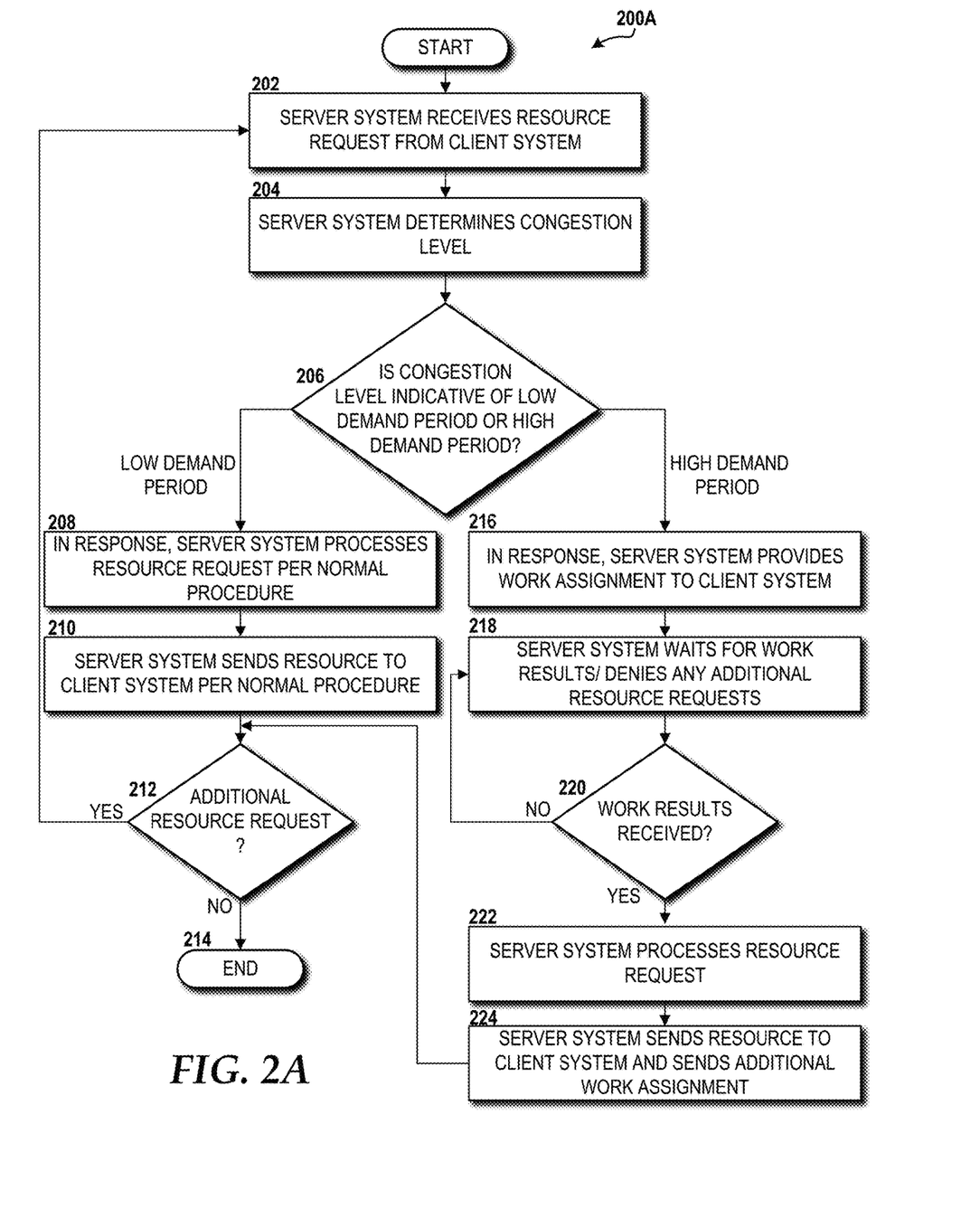
FIG. 2A is a flow diagram illustrating aspects of a method for using proof of work for preventing DDoS attacks, according to an embodiment.

Turning now to FIG. 2A, a flow diagram illustrating a method 200A for using proof of work for preventing DDoS attacks will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the methods are described as being performed, at least in part, by one or more processors (best shown in FIGS. 3, 4, and 6), via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the server system 104 receives a resource request from the client system 102. From operation 202, the method 200 proceeds to operation 204. At operation 204, the server system 104 determines a congestion level. In some embodiments, the congestion level is determined based upon a load metric and a threshold. When the load metric is above the threshold, the congestion level is determined to be indicative of a high demand period. When the load metric is at or below the threshold, the congestion level is determined to be indicative of a low demand period. The threshold can be set by a service provider (e.g., a service provider of the network 110) or an owner and/or operator of the server system 104.

From operation 204, the method 200 proceeds to operation 206. At operation 206, the server system 104 determines, based upon the threshold, whether the congestion level is indicative of a low demand period or a high demand period. If the congestion level is determined to be indicative of a low demand period, the method 200 proceeds to operation 208. At operation 208, in response to the resource request, the server system 104 processes the resource request per normal procedure. From operation 208, the method 200 proceeds to operation 210. At operation 210, the server system 104 sends the resource 114 to the client system 102 per normal procedure.

From operation 210, the method 200 proceeds to operation 212. At operation 212, the server system 104 determines whether an additional resource request has been received from the client system 102. If so, the method 200A returns to operation 202 and proceeds as described above. If not, the method 200A proceeds to operation 214. The method 200A can end at operation 214.

Returning to operation 206, if the congestion level is determined to be indicative of a high demand period, the method 200 proceeds to operation 216. At operation 216, in response to the resource request, the server system 104 provides a work assignment to the client system 102. From operation 216, the method 200 proceeds to operation 218. At operation 218, the server system 104 waits for work results for the work assignment sent to the client system 102. While the server system 104 waits for the work results, the server system 104 denies any additional resource requests from the client system 102. From operation 218, the method 200 proceeds to operation 220. At operation 220, the server system 104 determines if any work results have been received. If not, the method 200A returns to operation 218 described above. If so, the method 200A proceeds to operation 222.

At operation 222, the server system 104 processes the resource request. From operation 222, the method 200A proceeds to operation 224. At operation 224, the server system 104 sends the resource to the client system 102. The server system 104 can also send one or more additional work assignments.

From operation 224, the method 200 proceeds to operation 212. At operation 212, the server system 104 determines whether an additional resource request has been received from the client system 102. If so, the method 200A returns to operation 202 and proceeds as described above. If not, the method 200A proceeds to operation 214. The method 200A can end at operation 214.

Figure 2B:
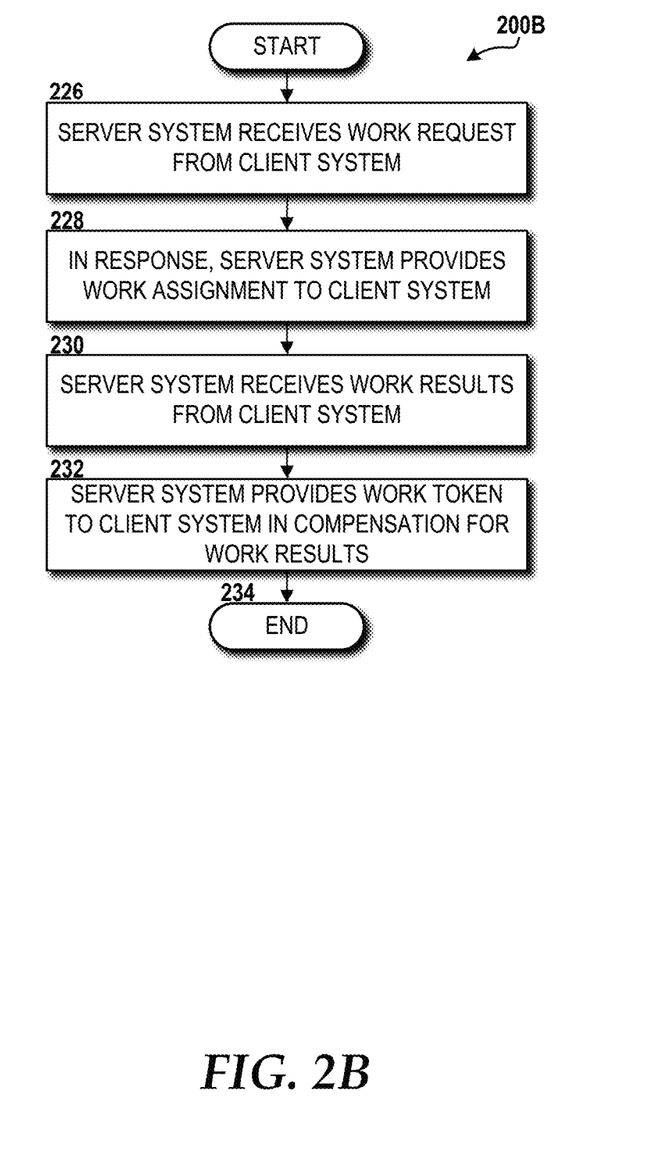
FIG. 2B is a flow diagram illustrating aspects of another method for using proof of work for preventing DDoS attacks, according to an embodiment.

Turning now to FIG. 2B, a flow diagram illustrating aspects of another method 200B for using proof of work for preventing DDoS attacks will be described, according to an illustrative embodiment. The method 200B begins and proceeds to operation 226. At operation 226, the server system 104 receives a work request from the client system 102. The work request can be sent by the client system 102 prior to the client system 102 requesting any resource(s) 114 from the server system 104. In this manner, the client system 102 can obtain tokens to use during a high demand period. Additionally or alternatively, the work request can be sent by the client system 102 after the client system 102 has exhausted all tokens. These work requests can be used to request additional work assignments during a high demand period to earn tokens for requesting additional resource(s) 114 from the server system 104 during the high demand period.

From operation 226, the method 200B proceeds to operation 228. At operation 228, in response to the work request, the server system 104 provides one or more work assignments to the client system 102. From operation 228, the method 200B proceeds to operation 230. At operation 230, the server system 104 receives work results from the client system 102.

From operation 230, the method 200 proceeds to operation 232. At operation 232, the server system 104 provides one or more work tokens to the client system 102 in compensation for the work results.

From operation 232, the method 200 proceeds to operation 234. The method 200 can end at operation 234.

Figure 3:
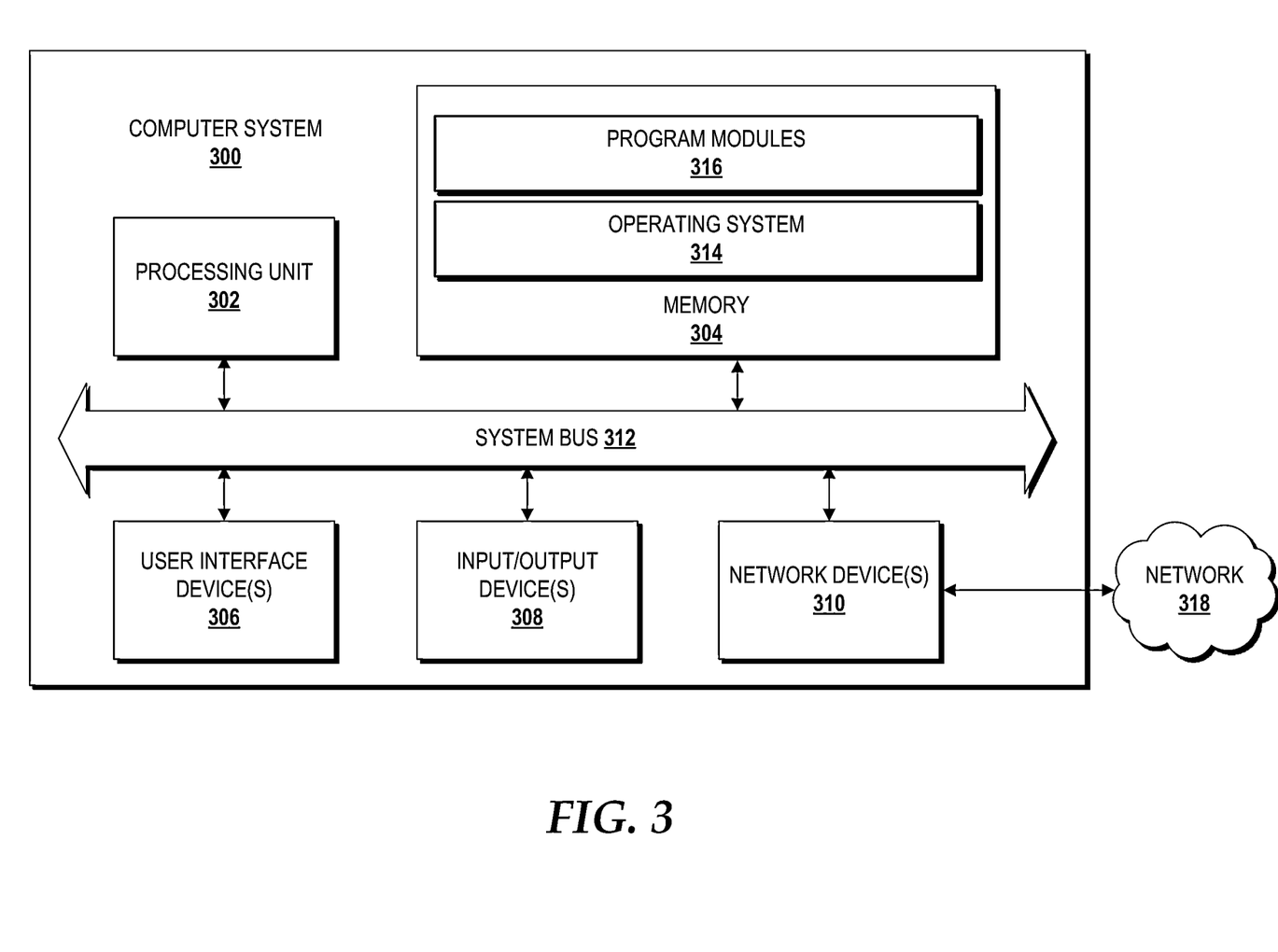
FIG. 3 is a block diagram illustrating an example computer system and components thereof capable of implementing aspects of the embodiments presented herein.

Turning now to FIG. 3, a block diagram illustrating a computer system 300 configured to provide the functionality in accordance with various embodiments of the concepts and technologies disclosed herein. The systems, devices, and other components disclosed herein can utilize, at least in part, an architecture that is the same as or at least similar to the architecture of the computer system 300. For example, the client system 102 and/or the server system 104 can utilize, at least in part, an architecture that is the same as or at least similar to the architecture of the computer system 300. It should be understood, however, that modification to the architecture may be made to facilitate certain interactions among elements described herein.

The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 304 communicates with the processing unit 302 via the system bus 312. In some embodiments, the memory 304 is operatively connected to a memory controller (not shown) that enables communication with the processing unit 302 via the system bus 312. The memory 304 includes an operating system 314 and one or more program modules 316. The operating system 314 can include, but is not limited to, members of the WINDOWS, WINDOWS CE, and/or WINDOWS MOBILE families of operating systems from MICROSOFT CORPORATION, the LINUX family of operating systems, the MAC OSX and/or iOS families of operating systems from APPLE CORPORATION, other operating systems, and the like.

The program modules 316 may include various software and/or program modules to perform the various operations described herein. The program modules 316 for the computer system 300 embodied as the client system 102 can include the client application 108. The program modules 316 for the computer system 300 embodied as the server system 104 can include the server application 112. The program modules 316 and/or other programs can be embodied in computer-readable media containing instructions that, when executed by the processing unit 302, perform one or more operations, such as the operations described herein above with reference to the methods 200A, 200B illustrated in FIGS. 2A and 2B, respectively. According to embodiments, the program modules 316 may be embodied in hardware, software, firmware, or any combination thereof.

By way of example, and not limitation, computer-readable media may include any available computer storage media or communication media that can be accessed by the computer system 300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300. In the claims, the phrase "computer storage medium," "computer-readable storage medium," and variations thereof does not include waves or signals per se and/or communication media, and therefore should be construed as being directed to "non-transitory" media only.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 316. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

Figure 5:
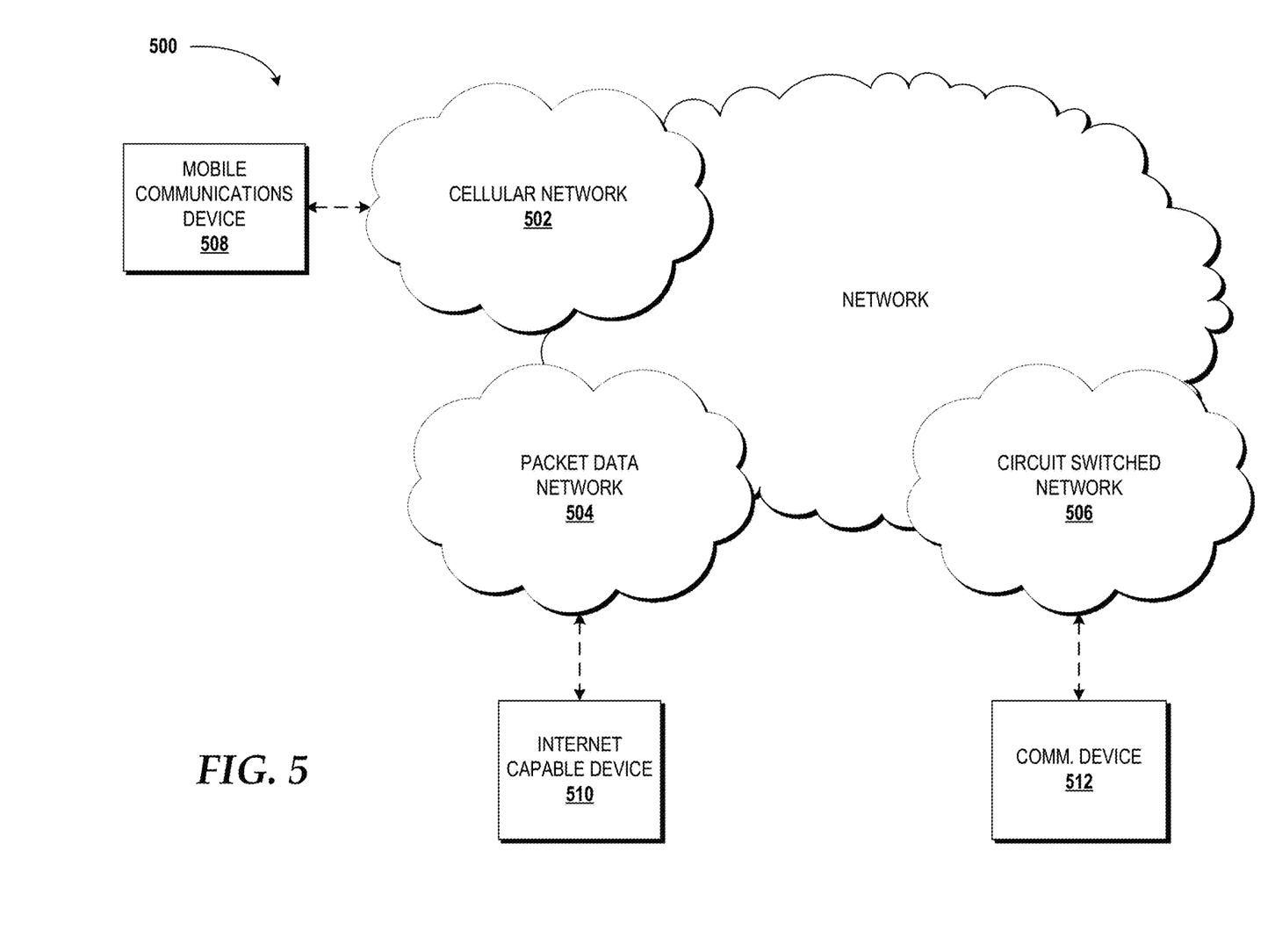
FIG. 5 is a block diagram illustrating an example network capable of implementing aspects of the embodiments presented herein.

The network devices 310 enable the computer system 300 to communicate with other networks or remote systems via a network 318, such as the network 110/500 (best shown in FIGS. 1 and 5). Examples of the network devices 310 include, but are not limited to, a modem, a radio frequency ("RF") or infrared ("IR") transceiver, a telephonic interface, a bridge, a router, or a network card. The network 318 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 318 may be a wired network such as, but not limited to, a wide area network ("WAN"), a wired LAN such as provided via Ethernet, a wired personal area network n ("PAN"), or a wired metropolitan area network ("MAN").

Figure 4:
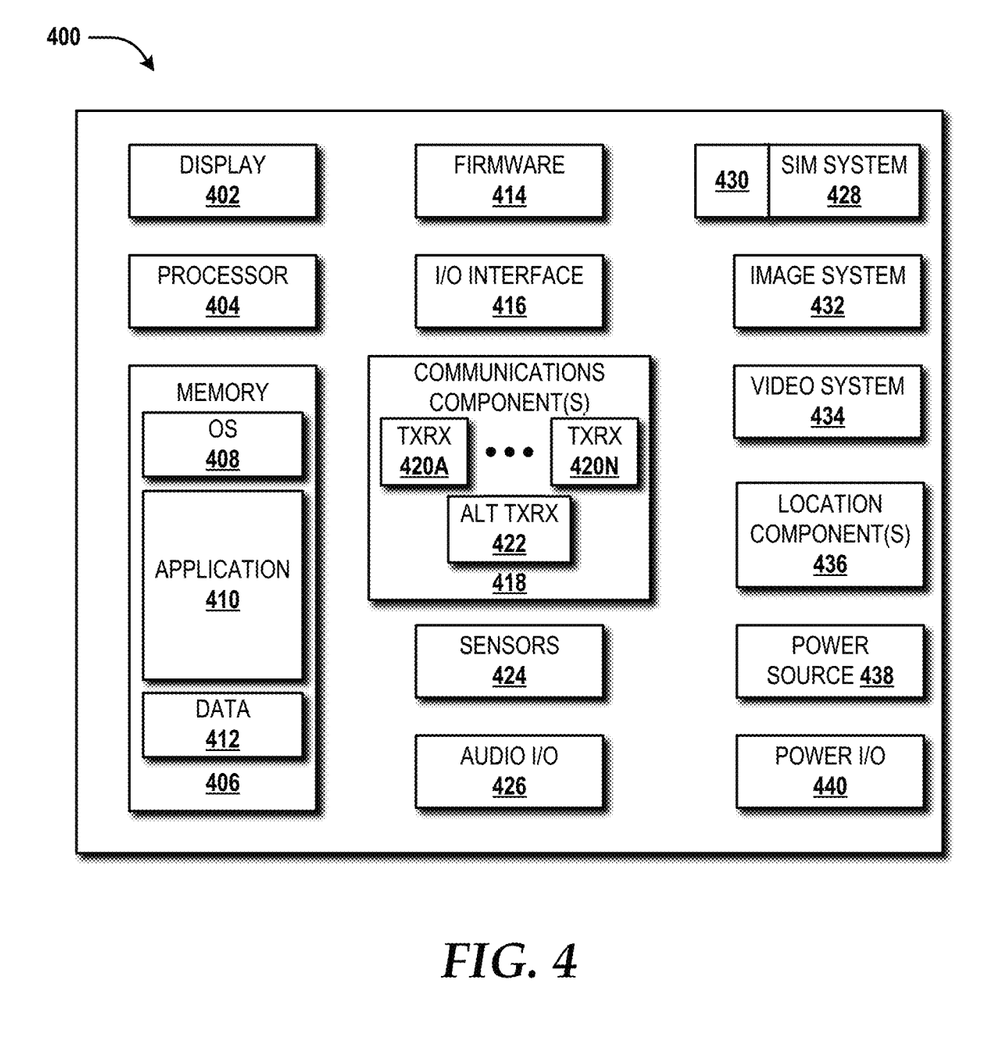
FIG. 4 is a block diagram illustrating an example mobile device and components thereof capable of implementing aspects of the embodiments presented herein.

Turning now to FIG. 4, an illustrative mobile device 400 and components thereof will be described. In some embodiments, the client system 102 described above with reference to FIG. 1 can be configured as and/or can have an architecture similar or identical to the mobile device 400 described herein in FIG. 4. It should be understood, however, that the client system 102 may or may not include the functionality described herein with reference to FIG. 4. While connections are not shown between the various components illustrated in FIG. 4, it should be understood that some, none, or all of the components illustrated in FIG. 4 can be configured to interact with one other to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410 (e.g., the client application 108), other computer-executable instructions stored in a memory 406, or the like. In some embodiments, the applications 410 also can include a UI application (not illustrated in FIG. 4).

The UI application can interface with the operating system 408 to facilitate user interaction with functionality and/or data stored at the mobile device 400 and/or stored elsewhere. In some embodiments, the operating system 408 can include a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in entering content, viewing account information, answering/initiating calls, entering/deleting data, entering and setting user IDs and passwords for device access, configuring settings, manipulating address book content and/or settings, multimode interaction, interacting with other applications 410, and otherwise facilitating user interaction with the operating system 408, the applications 410, and/or other types or instances of data 412 that can be stored at the mobile device 400.

According to various embodiments, the applications 410 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 410, the data 412, and/or portions thereof can be stored in the memory 406 and/or in a firmware 414, and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as location information, user information, organization information, presence status information, user IDs, passwords, and application initiation (start-up) requests. In some embodiments, the I/O interface 416 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 404 to facilitate wired and/or wireless communications with one or more networks described above herein. In some embodiments, other networks include networks that utilize non-cellular wireless technologies such as WI-FI or WIMAX. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments one or more of the transceivers of the communications component 418 may be configured to communicate using GSM, CDMA, CDMAONE, CDMA2000, LTE, and various other 2G, 2.5G, 3G, 4G, 5G, and greater generation technology standards. Moreover, the communications component 418 may facilitate communications over various channel access methods (which may or may not be used by the aforementioned standards) including, but not limited to, TDMA, FDMA, W-CDMA, OFDM, SDMA, and the like.

In addition, the communications component 418 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 418 can include a first transceiver ("TxRx") 420A that can operate in a first communications mode (e.g., GSM). The communications component 418 also can include an $N^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, orientation sensors, noise sensors, proximity sensors, or the like. As such, it should be understood that the sensors 424 can include, but are not limited to, accelerometers, magnetometers, gyroscopes, infrared sensors, noise sensors, microphones, combinations thereof, or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from GPS devices, A-GPS devices, WI-FI/WIMAX and/or cellular network triangulation data, combinations thereof, and the like. The location component 436 also can be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 438. The power source 438 can include one or more batteries, power supplies, power cells, and/or other power subsystems including alternating current ("AC") and/or direct current ("DC") power devices. The power source 438 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, UV, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 400 or other devices or computers described herein, such as the computer system 300 described below with reference to FIG. 3. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 400 in order to store and execute the software components presented herein. It is also contemplated that the mobile device 400 may not include all of the components shown in FIG. 4, may include other components that are not explicitly shown in FIG. 4, or may utilize an architecture completely different than that shown in FIG. 4.

Turning now to FIG. 5, additional details of a network 500, such as the network 110, are illustrated and will be described, according to an illustrative embodiment. The network 500 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, the client system 102, a cellular telephone, a user equipment, a mobile terminal, a PDA, a laptop computer, a handheld computer, and combinations thereof, can be operatively connected to the cellular network 502. The cellular network 502 can be configured as a 2G Global System for Mobile communications ("GSM") network and can provide data communications via General Packet Radio Service ("GPRS") and/or Enhanced Data rates for GSM Evolution ("EDGE"). Additionally, or alternatively, the cellular network 502 can be configured as a 3G Universal Mobile Telecommunications System ("UMTS") network and can provide data communications via the High-Speed Packet Access ("HSPA") protocol family, for example, High-Speed Downlink Packet Access ("HSDPA"), Enhanced UpLink ("EUL") (also referred to as High-Speed Uplink Packet Access ("HSUPA")), and HSPA+. The cellular network 502 also is compatible with 4G mobile communications standards such as Long-Term Evolution ("LTE"), or the like, as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system ("POTS"). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, the client system 102, the server system 104, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 500 is used to refer broadly to any combination of the networks 502, 504, 506. It should be appreciated that substantially all of the functionality described with reference to the network 500 can be performed by the cellular network 502, the packet data network 504, and/or the circuit switched network 506, alone or in combination with other networks, network elements, and the like.

Figure 6:
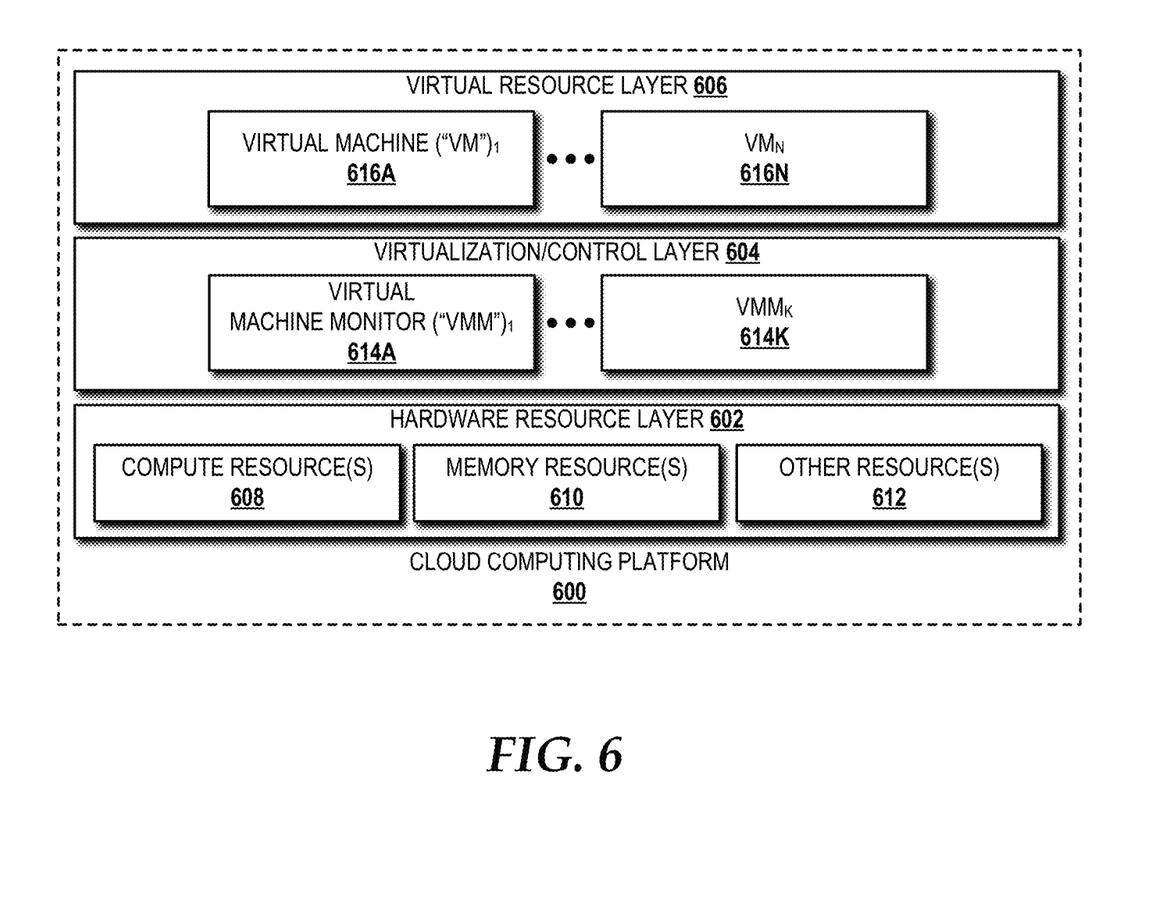
FIG. 6 is a block diagram illustrating an example cloud computing network and components thereof capable of implementing aspects of the embodiments presented herein.

Turning now to FIG. 6, a cloud computing platform 600 will be described, according to an exemplary embodiment. In some embodiments, the server system 104 can be implemented based upon an architecture similar to or the same as the cloud computing platform 600.

The cloud computing platform 600 is a shared infrastructure that can support multiple services and network applications. The illustrated cloud computing platform 600 includes a hardware resource layer 602, a virtualization/control layer 604, and a virtual resource layer 606 that work together to perform operations as will be described in detail herein.

The hardware resource layer 602 provides hardware resources, which, in the illustrated embodiment, include one or more compute resources 608, one or more memory resources 610, and one or more other resources 612. The compute resource(s) 608 can include one or more hardware components that perform computations to process data, and/or to execute computer-executable instructions of one or more application programs, operating systems, and/or other software. The compute resources 608 can include one or more central processing units ("CPUs") configured with one or more processing cores. The compute resources 608 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 608 can include one or more discrete GPUs. In some other embodiments, the compute resources 608 can include CPU and GPU components that are configured in accordance with a co-processing CPU/GPU computing model, wherein the sequential part of an application executes on the CPU and the computationally-intensive part is accelerated by the GPU. The compute resources 608 can include one or more system-on-chip ("SoC") components along with one or more other components, including, for example, one or more of the memory resources 610, and/or one or more of the other resources 612. In some embodiments, the compute resources 608 can be or can include one or more SNAPDRAGON SoCs, available from QUALCOMM of San Diego, California; one or more TEGRA SoCs, available from NVIDIA of Santa Clara, California; one or more HUMMINGBIRD SoCs, available from SAMSUNG of Seoul, South Korea; one or more Open Multimedia Application Platform ("OMAP") SoCs, available from TEXAS INSTRUMENTS of Dallas, Texas; one or more customized versions of any of the above SoCs; and/or one or more proprietary SoCs. The compute resources 608 can be or can include one or more hardware components architected in accordance with an ARM architecture, available for license from ARM HOLDINGS of Cambridge, United Kingdom. Alternatively, the compute resources 608 can be or can include one or more hardware components architected in accordance with an x86 architecture, such an architecture available from INTEL CORPORATION of Mountain View, California, and others. Those skilled in the art will appreciate the implementation of the compute resources 608 can utilize various computation architectures, and as such, the compute resources 608 should not be construed as being limited to any particular computation architecture or combination of computation architectures, including those explicitly disclosed herein.

The memory resource(s) 610 can include one or more hardware components that perform storage operations, including temporary or permanent storage operations. In some embodiments, the memory resource(s) 610 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 608.

The other resource(s) 612 can include any other hardware resources that can be utilized by the compute resources(s) 608 and/or the memory resource(s) 610 to perform operations described herein. The other resource(s) 612 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 602 can be virtualized by one or more virtual machine monitors ("VMMs") 614A-614K (also known as "hypervisors;" hereinafter "VMMs 614") operating within the virtualization/control layer 604 to manage one or more virtual resources that reside in the virtual resource layer 606. The VMMs 614 can be or can include software, firmware, and/or hardware that alone or in combination with other software, firmware, and/or hardware, manages one or more virtual resources operating within the virtual resource layer 606.

The virtual resources operating within the virtual resource layer 606 can include abstractions of at least a portion of the compute resources 608, the memory resources 610, the other resources 612, or any combination thereof. These abstractions are referred to herein as virtual machines ("VMs"). In the illustrated embodiment, the virtual resource layer 606 includes VMs 616A-616N (hereinafter "VMs 616"). Each of the VMs 616 can execute one or more applications.

Based on the foregoing, it should be appreciated that concepts and technologies directed to using proof of work for preventing DDoS attacks have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   receiving, by a server system comprising a processor, a resource request from a client system, wherein the resource request specifies a resource;
   determining, by the server system, a congestion level based upon a load metric and a threshold;
   in response to determining that the load metric is above the threshold, determining, by the server system, that the congestion level is indicative of a high demand period;
   in response to the resource request being received during the high demand period, providing, by the server system, a work assignment to the client system;
   receiving, by the server system, work results for the work assignment sent to the client system;
   in response to receiving the work results, processing, by the server system, the resource request and sending the resource to the client system;
   receiving, by the server system, a work request from the client system during a pre-request token generation period;
   in response to the work request, sending, by the server system, a further work assignment to the client system;
   receiving, by the server system, further work results associated with the further work assignment; and
   providing, by the server system, in compensation for the further work results, a token to be used to request the resource during the high demand period.

2. The method of claim 1, further comprising:
   while waiting for the work results, receiving, by the server system, an additional resource request from the client system; and
   denying, by the server system, the additional resource request.

3. The method of claim 2, wherein denying, by the server system, the additional resource request comprises ignoring, by the server system, the additional resource request.

4. The method of claim 1, wherein sending, by the server system, the resource to the client system comprises sending, by the server system, the resource to the client system along with an additional work assignment.

5. The method of claim 1, wherein receiving, by the server system, the work request from the client system comprises receiving, by the server system, the work request from the client system during the high demand period.

6. The method of claim 1, wherein the resource request comprises a token to compensate the server system for the resource during the high demand period.

7. A computer-readable storage medium comprising computer-executable instructions that, when executed by a processor of a server system, cause the processor to perform operations comprising:
   receiving a resource request from a client system, wherein the resource request specifies a resource;
   determining a congestion level based upon a load metric and a threshold;
   in response to determining that the load metric is above the threshold, determining that the congestion level is indicative of a high demand period;
   in response to the resource request being received during the high demand period, providing a work assignment to the client system;
   receiving work results for the work assignment sent to the client system;

in response to receiving the work results, processing the resource request and sending the resource to the client system;

receiving a work request from the client system during a pre-request token generation period;

in response to the work request, sending a further work assignment to the client system;

receiving further work results associated with the further work assignment; and providing, in compensation for the further work results, a token to be used to request the resource during the high demand period.

8. The computer-readable storage medium of claim 7, wherein the operations further comprise:

while waiting for the work results, receiving an additional resource request from the client system; and denying the additional resource request.

9. The computer-readable storage medium of claim 8, wherein denying the additional resource request comprises ignoring the additional resource request.

10. The computer-readable storage medium of claim 7, wherein sending the resource to the client system comprises sending the resource to the client system along with an additional work assignment.

11. The computer-readable storage medium of claim 7, wherein receiving the work request from the client system comprises receiving the work request from the client system during the high demand period.

12. A server system comprising:

a processor; and a memory comprising instructions that, when executed by the processor, cause the processor to perform operations comprising receiving a resource request from a client system, wherein the resource request specifies a resource, determining a congestion level based upon a load metric and a threshold, in response to determining that the load metric is above the threshold, determining that the congestion level is indicative of a high demand period, in response to the resource request being received during the high demand period, providing a work assignment to the client system, receiving work results for the work assignment sent to the client system, in response to receiving the work results, processing the resource request and sending the resource to the client system, receiving a work request from the client system during a pre-request token generation period, in response to the work request, sending a further work assignment to the client system, receiving further work results associated with the further work assignment, and providing, in compensation for the further work results, a token to be used to request the resource during the high demand period.

13. The server system of claim 12, wherein the operations further comprise:

while waiting for the work results, receiving an additional resource request from the client system; and denying the additional resource request.

14. The server system of claim 12, wherein sending the resource to the client system comprises sending the resource to the client system along with an additional work assignment.

\* \* \* \* \*